(12) United States Patent
Nojima

(10) Patent No.: US 7,467,143 B2
(45) Date of Patent: Dec. 16, 2008

(54) STORAGE OPERATION MANAGEMENT SYSTEM

(75) Inventor: Hiroshi Nojima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 10/649,635

(22) Filed: Aug. 28, 2003

(65) Prior Publication Data

US 2004/0225662 A1 Nov. 11, 2004

(30) Foreign Application Priority Data

May 8, 2003 (JP) ............................. 2003-130041

(51) Int. Cl.
*G06F 17/30* (2006.01)
(52) U.S. Cl. ........................ 707/10; 711/100
(58) Field of Classification Search ................. 707/10, 707/100, 200, 201, 202, 205, 2, 1; 709/223, 709/226, 224; 711/114, 170, 111, 100, 117; 713/213
See application file for complete search history.

(56) References Cited

U.S. PATENT DOCUMENTS

| | | | |
|---|---|---|---|
| 5,018,060 A * | 5/1991 | Gelb et al. ................... 707/205 |
| 5,131,087 A * | 7/1992 | Warr ........................... 711/113 |
| 6,742,035 B1* | 5/2004 | Zayas et al. .................. 709/226 |
| 6,889,285 B2* | 5/2005 | Dawson et al. .................. 711/4 |
| 6,978,282 B1* | 12/2005 | Dings et al. .................. 707/204 |
| 7,020,697 B1* | 3/2006 | Goodman et al. ........... 709/223 |
| 7,328,260 B1* | 2/2008 | Muthiyan et al. ........... 709/224 |
| 2003/0018653 A1 | 1/2003 | Iwasaki et al. |
| 2003/0046491 A1* | 3/2003 | Katsurashima ............... 711/114 |
| 2003/0126190 A1* | 7/2003 | Wada et al. .................. 709/201 |
| 2003/0233518 A1* | 12/2003 | Yamagami et al. .......... 711/114 |
| 2004/0122799 A1* | 6/2004 | Goyal et al. .................... 707/2 |
| 2004/0193879 A1 | 9/2004 | Sonoda et al. .............. 713/165 |
| 2004/0215879 A1 | 10/2004 | Matsunami et al. ......... 711/114 |
| 2004/0243600 A1 | 12/2004 | Ikeda et al. ................. 707/100 |
| 2005/0033936 A1* | 2/2005 | Nakano et al. .............. 711/170 |
| 2005/0065984 A1* | 3/2005 | Yagisawa et al. ............ 707/200 |
| 2005/0114593 A1* | 5/2005 | Cassell et al. ............... 711/114 |

OTHER PUBLICATIONS

Microsoft Computer Dictionary Fifth Edition, p. 222, Microsoft Press 2002.*
Zobel et al., Trends in Retrieval System Performance, Computer Science Conference 2000, ACSC 2000, 23rd Australasian, Jan. 31-Feb. 3, 2000, pp. 1-8, Digital Object Identifier 10.1109/ACSC.2000.824410.*

* cited by examiner

*Primary Examiner*—Greta L Robinson
(74) *Attorney, Agent, or Firm*—Mattingly, Stanger, Malur & Brundidge, P.C.

(57) ABSTRACT

In a storage operation management system, upper and lower limits of a level threshold of a volume to be selected from a characteristic value of a volume management table are calculated and the volume within the range is presented to a user as an allocation candidate. When a change occurs in a storage device that configures the system, setting of the threshold suited to the change of the system configuration as well as selection and allocation of the volume based on a newly set threshold are enabled by automatically updating the volume management table.

2 Claims, 13 Drawing Sheets

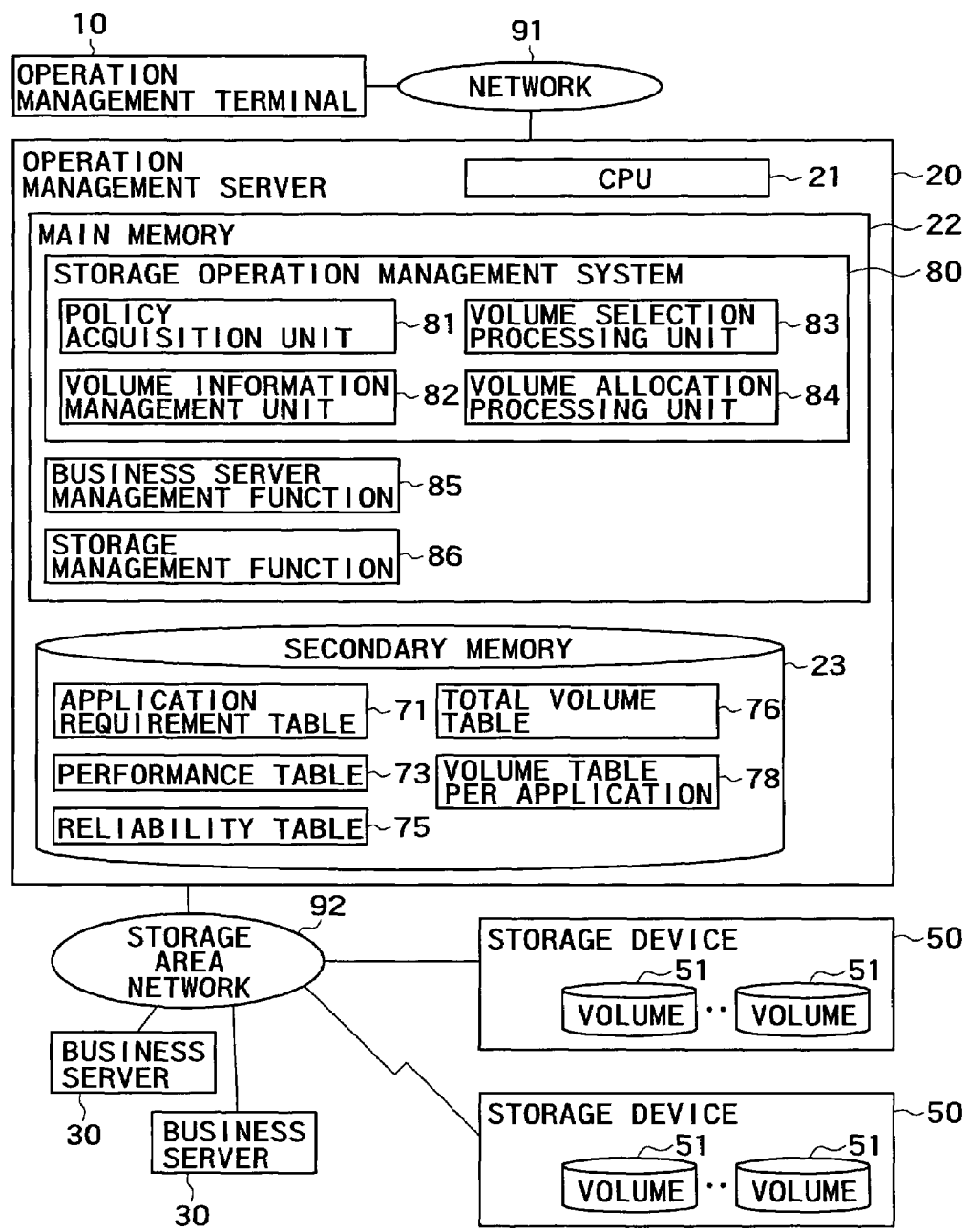

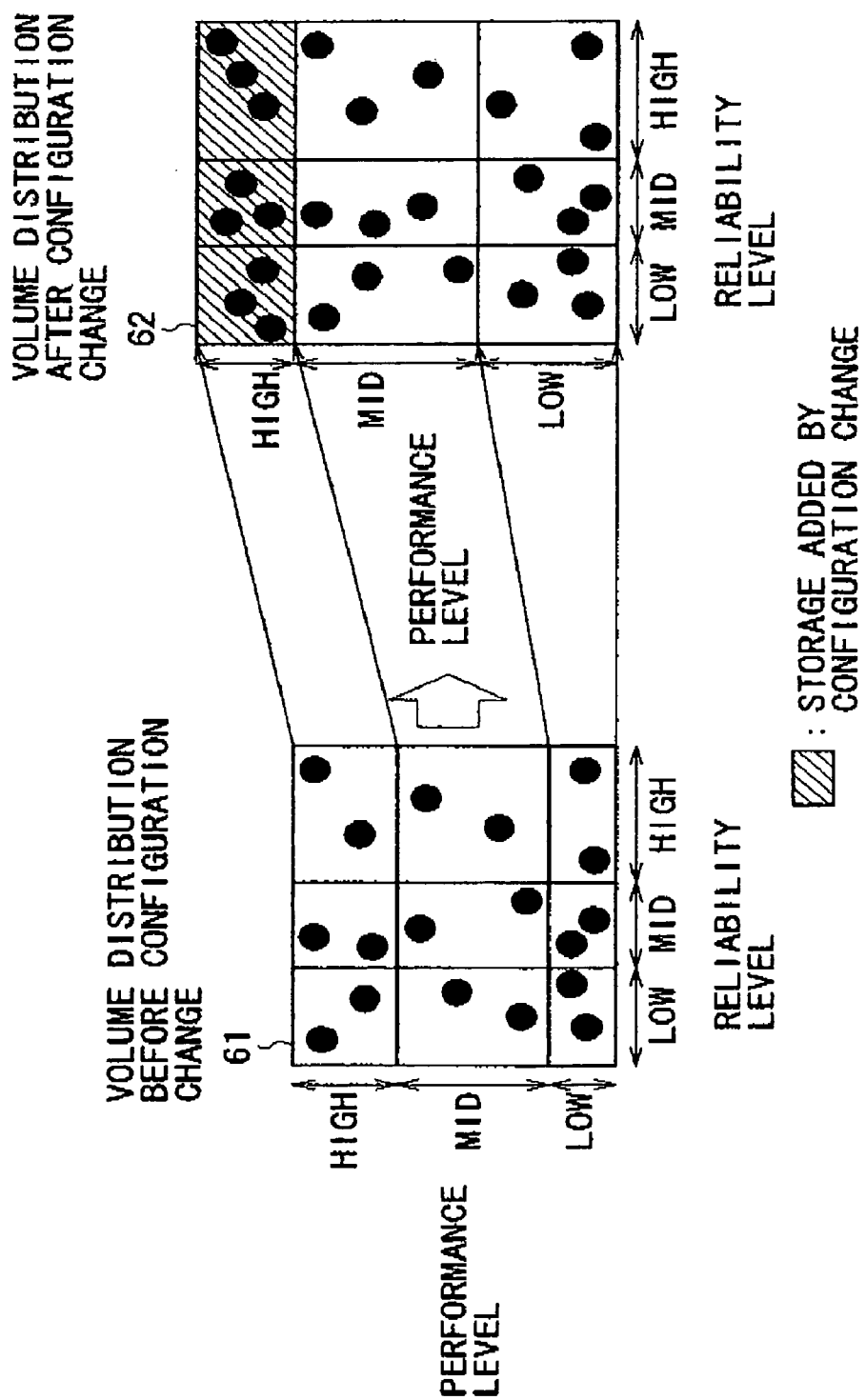

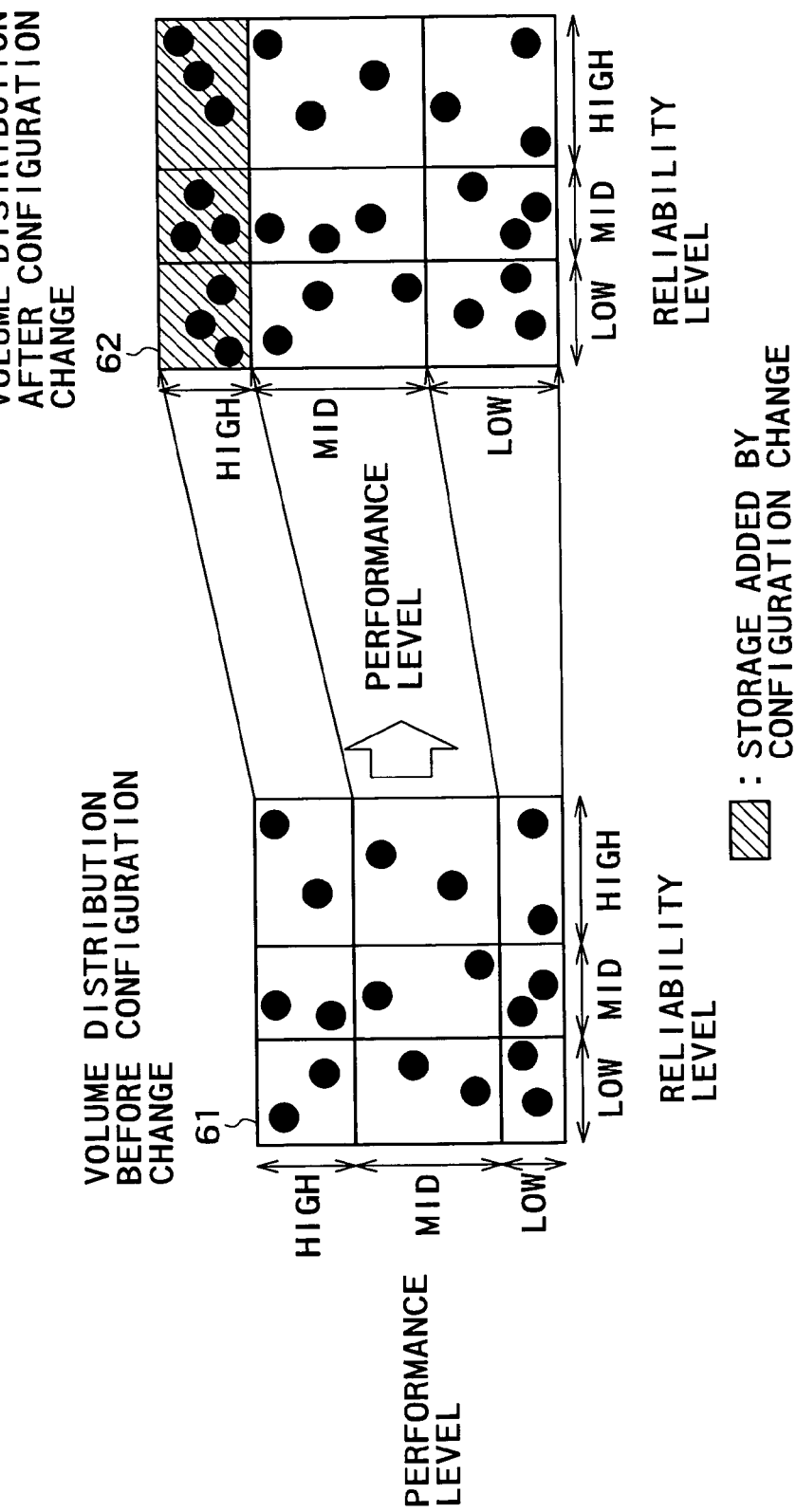

FIG. 3

71 APPLICATION REQUIREMENT TABLE

| | | NECESSARY PERFORMANCE 712 713 714 715 | | | COEFFICIENT OF EVALUATION FUNCTION 717 718 | | |
|---|---|---|---|---|---|---|---|
| | RAID LEVEL | WRITE PERFOR-MANCE | READ PERFOR-MANCE | IOPS | WRITE PERFORMANCE VALUE | READ PERFORMANCE VALUE | IOPS |
| APPLICATION TYPE 711 | | | | | | | |
| 721 (DEFAULT) | * | * | * | * | 1.0 | 1.0 | 20 |
| 722 WEB CONTENTS | * | * | 2200 | 20 | 1.0 | 2.0 | 50 |
| 723 IMAGE FILE | RAID5 | * | 2200 | * | 0.5 | 4.0 | 40 |
| 724 DBMS MANAGEMENT AREA | RAID1 | 1500 | 2000 | 40 | 1.0 | 1.0 | 80 |
| ... | ... | ... | ... | ... | ... | ... | ... |

FIG. 4

73 PERFORMANCE TABLE

| | 731 | 732 | 733 | 734 | 735 | 736 | 737 |
|---|---|---|---|---|---|---|---|
| | TYPE NAME | DRIVE TYPE | RAID LEVEL | DRIVE CONFIGURATION | WRITE PERFORMANCE | READ PERFORMANCE | IOPS |
| 741 | RAID400 | 36GB | RAID1 | 1D+1P | 2000 | 2000 | 80 |
| 742 | RAID400 | 18GB | RAID5 | 3D+1P | 1500 | 2400 | 20 |
| 743 | DF500 | 18GB | RAID5 | 3D+1P | 1200 | 2200 | 15 |
| 744 | DF500 | 9GB | RAID5 | 7D+1P | 1400 | 2500 | 14 |
| | ... | ... | ... | ... | ... | ... | ... |

FIG. 5

75 RELIABILITY TABLE

| | TYPE NAME | RAID LEVEL | DRIVE CONFIGURATION | RELIABILITY |
|---|---|---|---|---|
| | 751 | 752 | 753 | 754 |
| 755 | * | RAID1 | 1D+1P | 8 |
| 756 | RAID400 | RAID5 | 3D+1P | 6 |
| 757 | DF500 | RAID5 | 3D+1P | 5 |
| 758 | * | RAID5 | 7D+1P | 3 |
| 759 | * | RAID0 | * | 1 |
| | ... | ... | ... | ... |

FIG. 6

76 TOTAL VOLUME TABLE

| | 761 | 762 | 763 | 764 | 765 | 766 |
|---|---|---|---|---|---|---|
| | VOLUME ID | TYPE NAME | DRIVE TYPE | RAID LEVEL | DRIVE CONFIGURATION | ALLOCATED STATE |
| 771 | R40.1.1 | RAID400 | 36GB | RAID1 | 1D+1P | UNALLOCATED |
| 772 | R40.1.21 | RAID400 | 18GB | RAID5 | 3D+1P | UNALLOCATED |
| 773 | R50.7.1 | DF500 | 18GB | RAID5 | 3D+1P | ALLOCATED |
| 774 | R50.7.31 | DF500 | 9GB | RAID5 | 7D+1P | UNALLOCATED |
| | ... | ... | ... | ... | ... | ... |

FIG. 7

78 VOLUME TABLE (PER APPLICATION)

| APPLICATION TYPE | VOLUME ID | PERFORMANCE LEVEL | RELIABILITY LEVEL | ALLOCATED STATE |
|---|---|---|---|---|
| IMAGE FILE | R40.1.21 | 11150 | 6 | UNALLOCATED |
| IMAGE FILE | R50.7.1 | 10000 | 5 | ALLOCATED |
| IMAGE FILE | R50.7.31 | 11260 | 3 | UNALLOCATED |
| ... | ... | ... | ... | ... |

```
┌─────────────────────────────────┐
│ CONFIRMATION SCREEN             │
├─────────────────────────────────┤
│ BUSINESS SERVER                 │
│   SERVER NAME:Host01            │
│                                 │
│ APPLICATION                     │
│   TYPE:WEB CONTENTS             │
│                                 │
│ POLICY                          │
│   PERFORMANCE LEVEL:MID         │
│   RELIABILITY LEVEL:HIGH        │
│                                 │
│ SELECTED VOLUME                 │
│   TYPE NAME:DF500               │
│   VOLUME ID:D50.7.31            │
│                                 │
│              ┌─────┐  ┌────────┐│
│              │ OK  │  │ CANCEL ││
│              └─────┘  └────────┘│
└─────────────────────────────────┘
```

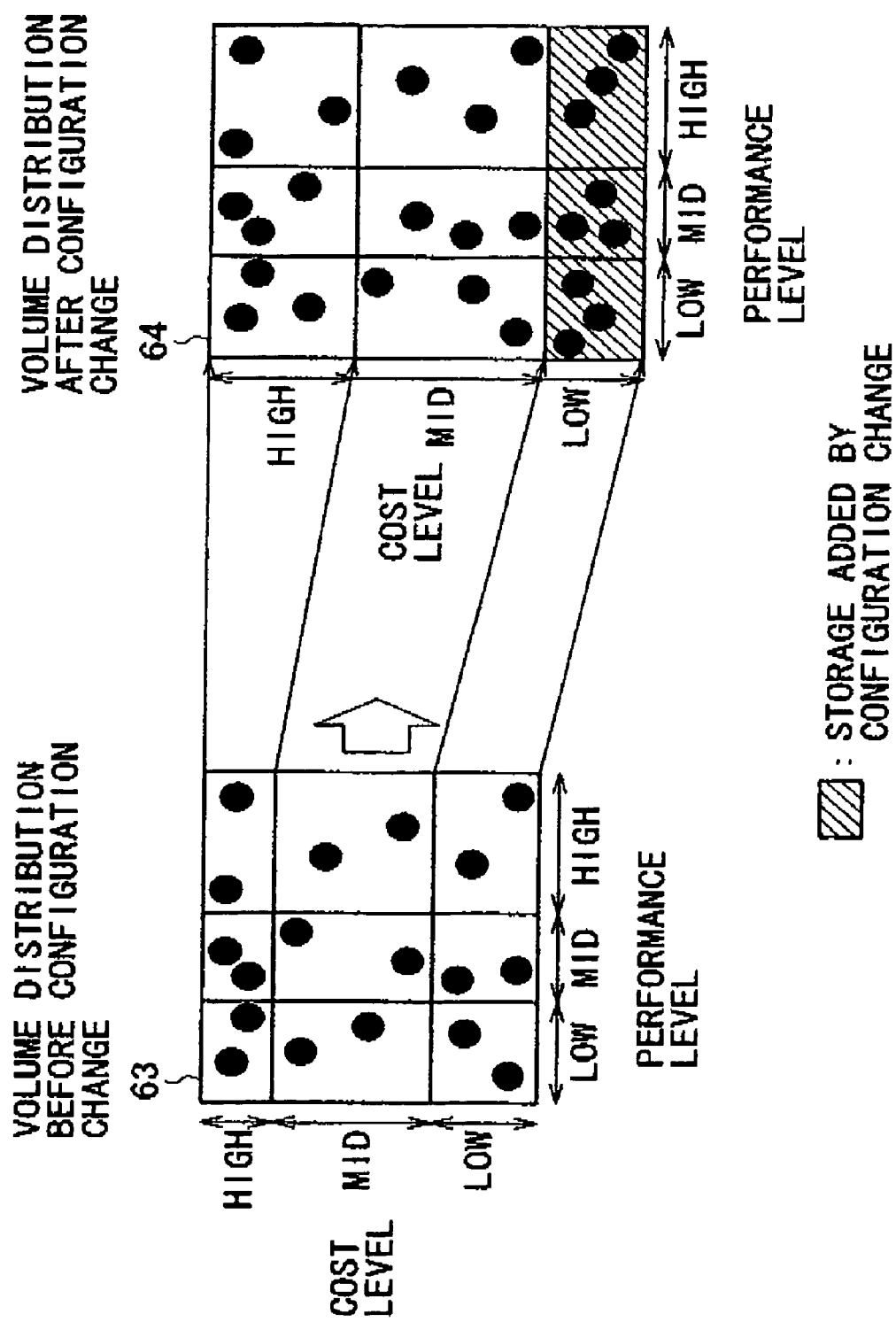

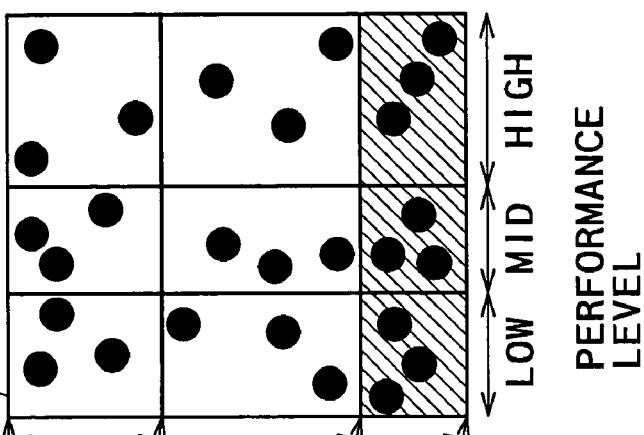
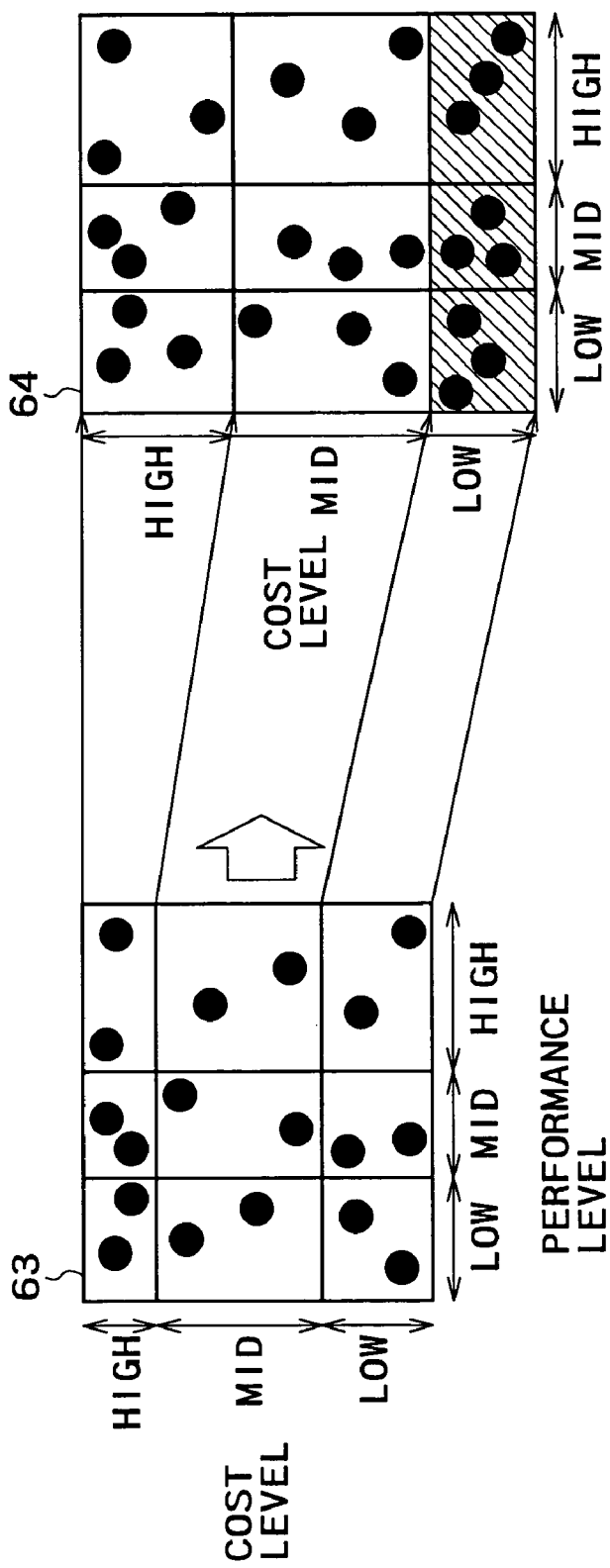

STORAGE OPERATION MANAGEMENT SYSTEM

BACKGROUND OF THE INVENTION

1. Field of the Invention

The present invention relates to a storage operation management system, and more particularly to an operation management technology of a storage area network (SAN) that decides an object range of a volume that is assumed to be an allocation candidate and a candidate volume based on policy information input regarding storage volume allocation from a user.

2. Description of the Prior Art

With the spread of an electronic business transaction and an increase in the utilization of multimedia data, the quantity of data an enterprise handles is increasing suddenly. As a result of this, an SAN technology that can handle a large amount of data effectively is spreading.

The flexibility of a business information system has increased by the installation of the SAN, but the configuration of storage equipment becomes complicated and the setting of the equipment a system administrator performs is also complicated. Further, because centralized control of storage has been enabled, not only the quantity of data handled by one system administrator increases but also an operating system (OS) of a business server and a type of a business application are increasing. Further, because the amount of data is inclined to increase day by day, the enhancement of the storage equipment and the allocation work of storage to the business server is being performed frequently.

In order to simplify a storage operation business in this manner, an operation technology that collects various types of condition elements and rules as policies, and names and defines the policy, then automatically decides a volume to be allocated by an operation based on the policies is becoming commonly accepted.

There are the following methods for specifying a volume selection policy that decides an object of storage allocation in the prior technology.

The first method explicitly specifies retrieval conditions of a volume that is assumed to be an allocation candidate as the policies. Classification of storage equipment that is assumed to be a candidate by a type name and specification such as types (RAID1 and RAID5) of RAID (Redundant Arrays of Inexpensive Disks) and drive configurations (3D+1P (one parity disk to three data disks)) are defined based on the policies.

The second method performs relative specification such as "High", "Mid", and "Low" respectively from the standpoint of performance and reliability or specification without levels as well as at three levels instead of specific specification as a type name, a RAID type, and a drive configuration of storage equipment. Even in a case like this, however, which of items is applicable to each of "High", "Mid", and "Low" inside an operation management system if they are expressed in the storage equipment type name, RAID type, and drive configuration? In most cases, they are associated statically.

Regarding this kind of the technology, a method for setting a logical area in a disk unit by preparing a table in which policies were registered, referring to this table when the logical area is set in the disk unit, and converting the table to performance and reliability information based on the policies is disclosed in Japanese Unexamined Patent Application Publication No. Hei 14 (2002)-222601, for example.

In the aforementioned methods, in the former method. It is difficult to realize the optimum volume allocation unless a user himself or herself is familiar with characteristics of storage according to the volume specifications. Further, in the latter method, because the distribution every user's storage specifications varies by a change in equipment configuration that arises from the expansion of storage equipment, the volume classified into "High" at a point of time will also be classified into "Mid" some time. Accordingly, the necessity of reviewing an association inside the operation management system occurs and the work that decides how the association should be reviewed is complicated and becomes a workload of the user. Further, even in either case, when the volume is allocated, there is a problem that the user must consider a difference in requirement characteristics every business application.

SUMMARY OF THE INVENTION

An object of the present invention is to apply a storage management system whose volume allocation is easy and whose operability improves.

Another object of the present invention is to provide, when the configuration status of a storage device in a storage system changed, a storage operation management system that selects a volume in accordance with the change.

A further object of the present invention is to provide a storage operation management system that performs volume selection processing by managing requirement characteristics regarding a business application and classification of a level of performance or reliability by the storage operation management system and by allowing a user to relatively specify the type of the application and the performance or reliability level as policy elements.

The present invention has multiple storage devices connected to a network and an operation management server for controlling operations of these storage devices, and is realized by the operation management server in a storage system that provides information from the storage devices to a business server having multiple applications accessed via the network. That is this operation management server is constructed by having: a policy acquisition means which acquires a policy regarding a volume; a detection means which detects whether a change occurred in a configuration of the storage devices connected to the network; a volume information management means which, when the change was detected by the detection means, acquires a specification value of the volume from the changed storage device and updates volume management information, a memory means which holds an attribute value of a storage device corresponding to a type of an application used in the business server for a total volume including the volume updated by the volume information management means, a processing means which calculates a standard value for classification of the attribute value with reference to a type of the application obtained by referring to the memory means, and an allocation processing means in which an attribute value conforming to a type of an application with reference to the policy requested by the policy acquisition means allocates an unallocated volume within a range of a standard value calculated by the processing means.

For example, each of the aforementioned means is realized as a program that functions on a storage operation management system.

The policy acquisition means acquires the attribute value related to the volume sent from an operation management terminal via the network and Information including the type of the applications as policies. In a desirable example, this operation management terminal has a display, and the information on the specified policy and the information on the volume selected by the allocation processing means are displayed for a user's confirmation.

The memory means stores, desirably, a first table for managing the attribute value, a second table for managing information about the attribute value required corresponding to the type of the application, a third table for managing information that indicates a status of a total volume, and a fourth table that indicates the volume for every application type generated based on the information on the first to third tables, a level regarding the attribute value, and an allocation status of the volume to the business server.

The volume information management means has a means which adds the specification value acquired from the changed storage device to the first table as a record, a means which acquires volume information from the changed storage device, a means which adds the acquired volume information to the third table as a record, and a means which adds volume information for a changed application to the fourth table by referring the first to third tables as a record.

In a desirable example, a value regarding performance and reliability is used as the attribute value. Further, for example, information on the performance and reliability is stored in the memory means with reference to Web contents, an image file, and a DBMS management area as the application type.

The standard value of level classification in accordance with the type of the application when a volume is selected for the attribute value and a second calculation means calculates the standard value of the level classification in accordance with a change in distribution states of multiple storage devices for the attribute value after the configuration of a storage device changed. For example, this second calculation means calculates the standard value so that the volume of the same number can be included respectively in each rank in the classification.

The present invention is also grasped as a storage operation management method in a system including multiple storage devices connected to a network. This method, for example, has a step of obtaining a first distribution of multiple volumes with reference to at least one attribute value that evaluates the storage device, a first step that calculates a standard value of level classification in accordance with a type of an application when the volume is selected in the obtained first distribution, a step of detecting a change in a configuration of the storage device included in a system, a step of obtaining a second distribution of the multiple volumes with reference to the attribute value for the system including the storage device after the change, and a second calculation step that calculates the standard value of the level classification in accordance with the type of the application when the volume is selected in the obtained second distribution.

Desirably, performance and reliability are used as the attribute value and the first and second distribution of the multiple volumes are obtained regarding the performance and reliability. Further, performance and cost are used as the attribute value as another example and the first and second distribution of the multiple volumes regarding the performance and cost are obtained.

BRIEF DESCRIPTION OF THE DRAWINGS

FIG. 1 is a drawing showing system configuration for storage operation management according to one embodiment of the present invention;

FIG. 2 is a drawing showing a volume distribution state that arises from a storage configuration change;

FIG. 3 is a drawing showing an example of an application requirement table that defines necessary performance and evaluation function coefficients corresponding to an application;

FIG. 4 is a drawing showing an example of a performance table that defines a specification value of volume performance in each storage device;

FIG. 5 is a drawing showing an example of a reliability table that defines an index of volume reliability in each storage device;

FIG. 6 is a drawing showing an example of a total volume table that manages volume specifications and an allocated state of a volume to a business server;

FIG. 7 is a drawing showing an example of a volume table per application;

FIG. 10 is a drawing showing a display example of an operation management screen; and FIG. 11 is a drawing showing the volume distribution state according to another embodiment.

DESCRIPTION OF PREFERRED EMBODIMENTS

Figure 8:
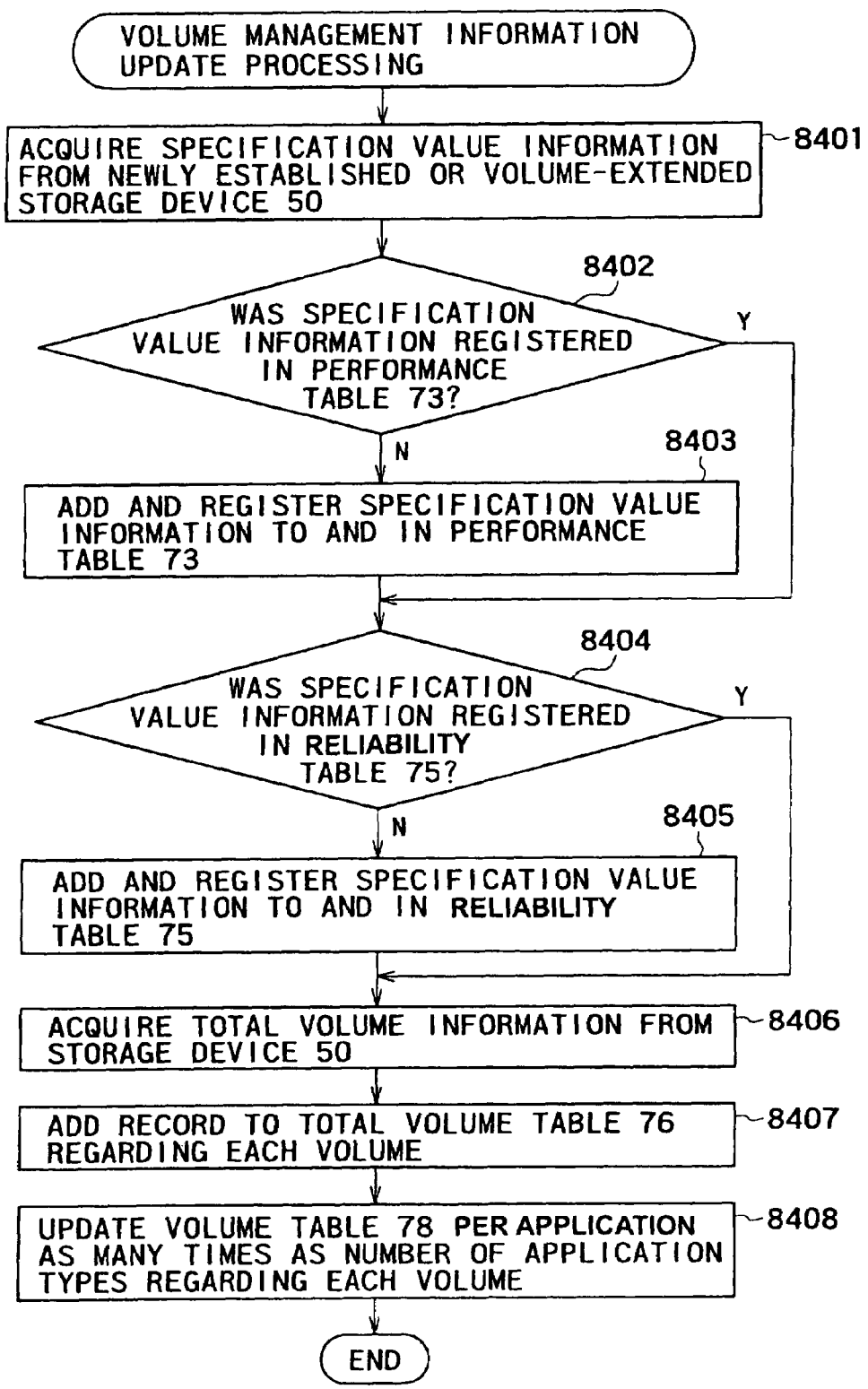
FIG. 8 is a drawing showing an example of a flowchart of processing that updates volume management information by a volume information management unit 82.

The embodiments of the present invention are described in detail below with reference to the drawings.

FIG. 1 is a bock diagram for a storage operation management system according to one embodiment.

This management system includes an operation management terminal 10, an operation management server 20, a business server 30, and a storage device 50. The operation management terminal 10 and the operation management server 20 are connected via a network 91. The operation management server 20, the operation server 30, and the storage device 50 are connected via an SAN 92. Moreover, including the connection of this example, for example, the operation management server 20, the business server 30, and the storage device 50 can also be connected to the network 91.

The operation management server 20 has a CPU 21 that is a processing unit, a main memory 22, and a secondary memory 23 such as a hard disk unit. The main memory 22 holds software that realizes a storage operation management system 80, a business server management function 85, and a storage management function 86 as application software. Further, the storage operation management system 80 has a policy acquisition unit 81, a volume information management unit 82, a volume selection processing unit 83, and a volume allocation processing unit 84. The functions implemented by these units are characteristic of the embodiments of the present invention and the details are described later.

The secondary memory 23 holds and manages an application requirement table 71, a performance table 73, a reliability table 75, a total volume table 76, and a volume table 78 per application. The configuration of these tables is characteristic of this embodiment and the details are described later.

Usually, the multiple business servers 30 are connected to the SAN 92. Each business server 30 has business application software such as a DBMS and a video server and implements various functions such as a DBMS server, a video server, and a Web server. Moreover, one business server can also have multiple business applications or can also process one business collectively by having only one application.

Usually, the multiple storage devices 50 are connected to the SAN 92. Each storage device 50 has, for example, multiple disk units that construct RAID (Redundant Arrays of Inexpensive Disks) and logically defined multiple volumes 51. These storage device 50 and volume 51 are controlled by the storage management function 86. One or multiple volumes are allocated to the business server 30 via the SAN 92.

Further, the operation management terminal 10 is composed of a personal computer, for example, and has a display, an input and output unit, and a memory. This terminal 10 has a function of displaying a system status on the display and allowing a system administrator to input and monitor various instructions in order to perform storage operation management.

FIG. 2 shows a state of volume distribution that arises from a storage configuration change. The left side of FIG. 2 shows reliability/performance level distribution of a volume before the configuration change. Eighteen volumes are divided and distributed into three levels of "High", "Mid", and "Low" respectively from the viewpoint of performance and reliability. Six volumes are classified evenly into each level. Subsequently, when a high performance and high reliability storage device is developed and such a situation as the storage device is used by this system, that is, when a change occurs in the system equipment configuration that arises from the expansion of the storage device, the distribution of storage used every specifications varies. Accordingly, the volume classified into "High" at a point of time before configuration change will also be classified into "Mid" sooner or later after configuration change as shown in FIG. 2.

In the embodiment of the present invention, when the configuration status of a storage device in a storage system changed, a user can decide a volume selection range in the intuitive relative specification regarding performance or reliability by resetting a device distribution status from the viewpoint of the performance/reliability. Accordingly, a volume is selected easily without resetting a policy definition and storage operation business costs can be reduced.

For example, when nine more volumes are extended (shaded portion) as shown in the right side of FIG. 2 from 18 volumes the left side of FIG. 2 at the beginning, in this embodiment, the resetting of a level is performed to redistribute a total of 27 volumes to which these nine volumes were added.

Accordingly, the performance and reliability levels are defined as attributes in a volume management table and values calculated using an evaluation function for every application are held as these attribute values. When the range that corresponds to the specification of a policy element from a user is divided into three levels, the upper and lower thresholds are calculated and reset based on the distribution of the attribute values.

In the embodiment of the present invention, the evaluation function per application is calculated and the distribution of an attribute value is obtained. Accordingly, however, several tables (also referred to as tables) are stored in the memory 23.

These tables are described below.

The structure of tables used in the storage operation management according to this embodiment is described with reference to FIGS. 3 to 7. Moreover, these tables are an example and are not limited to these field structures. If a field value is ignored (unspecified in particular), it is marked by an "*" (asterisk).

FIG. 3 shows the structure of an application requirement table 71 that provides the relationship between the performance required as an external memory and evaluation function coefficients when a performance value is calculated in each application operated by a business server.

This table 71 is created according to the definition of a system administrator and registers necessary performance and evaluation function coefficients corresponding to the type of the application. A RAID level 712, write performance 713, read performance 714, and an IOPS (number of IO instructions processed per second) 715 are provided as the necessary performance, and a write performance value 716, a read performance value 717, and an IOPS 718 are provided as the evaluation function coefficients.

An application type 711 is a name for identifying each application. In this example, Web contents 722, an image file 723, a DBMS management area 724, and a default 721 that specifies nothing are registered.

As the necessary performance, the RAID level 712 defines a RAID level that is assumed to be appropriate for the application. For example, RAID1 and RAID5 are registered. The write performance 713 indicates a required write performance level and defines a transfer performance value (M byte/sec) at continuous write operation. The read performance 714 indicates a required read performance level and defines a transfer performance value (M byte/sec) at continuous read operation. The IOPS 715 defines the number of 10 instructions required per second. Moreover, when even the same application type differs in a requirement according to a business server to be operated, a field in which a business server machine is identified is added to the table 71 and can also be specified as an application type in combination with an identifier of the business server machine.

Further, the write performance value 716, the read performance value 717, and the IOPS 718 are provided as the evaluation function coefficients. These coefficients are used to calculate a performance value of a volume table per application described later. The utilization of these coefficients is described later together with the description of the volume table 78 per application.

Examples of the records of Table 71 are described. The record 721 is a default applied when any application type is not specified, and defines only an evaluation function coefficient. The record 722 is the example of "Web Contents". Because the Web contents are mainly used for reference, the read performance 714 and the IOPS 715 are defined as the necessary performance. The record 723 is the example for "Image File" use. Because this application is used for the case where there is a large amount of data and continuous read performance is necessary, the RAID level 712 and the read performance 714 are defined. The record 724 is the example of "DBMS Management Area", and the necessary performance is all defined as indispensable performance.

FIG. 4 shows an example of the performance table 73 that defines a specification value of the performance of the volume in each storage device.

Table 73 lists a drive type 732, a RAID level 733, and a drive configuration 734 corresponding to types 741 to 744 registered in a type name column 731. The type name 731, the drive type 732, the RAID level 733, and the drive configuration 734 are key items for write performance 735, read performance 736, and an IOPS 737. The write performance 735 and the read performance 736 are values defined based on a performance value (M byte/sec) of a continuous data transfer rate a storage device provides. The IOPS 737 is a value defined based on the maximum number of IO instructions per unit second.

Specification values of the performance of these volumes are stored in each storage device. When a new storage device is added to this storage system and a configuration change occurs, the storage management function 86 of the operation management server 20 acquires these specification values from the changed storage device 20. Subsequently, Table 73 is updated and created by newly registering the values in this table 73.

FIG. 5 shows an example of the reliability table 75 that defines an index of the reliability of the volume in each storage device.

Table 75 lists a RAID level 752, a drive configuration 753, and reliability 754 corresponding to a type registered in a type name column 751. The type name 751, the RAID level 752, and the drive configuration 753 are key items for the reliability 754. The reliability 754 is a value defined based on a value such as an MTBF, for example. For example, the reliability "8" of the storage device registered in a type name column 755 will indicate eight times of the reliability "1" of the storage device registered in a type name column 759.

This reliability provided corresponding to a type name is what is called catalog values of a storage device and stored in the storage device. Thereupon, when a system configuration change is detected, the storage management function 86 of the management server 20 acquires the specification values regarding these reliability from the object storage device 50 in the same as the specification values of the aforementioned performance and registers them in Table 75. As a result of this, Table 75 is updated.

The contents of these performance table 73 and reliability table 75 are updated only when the configuration of the storage device in this system is changed.

FIG. 6 shows an example of the total volume table 76 that manages the specifications of the volume 51 inside the storage device 50 and an allocated state of the volume to a business server.

Table 76 registers a volume ID 761, a type name 762, a drive type 763, a RAID level 764, a drive configuration 765, and an allocated state 766. The volume ID 761 is an identifier used to discriminate the volume 51 respectively. The type name 762, the drive type 763, the RAID level 764, and the drive configuration 765 indicate the volume specifications identified by the volume ID 761. The allocated state 766 indicates whether the volume was allocated to the business server 30 or not.

The information in Table 76 is stored in the storage device 50 and the storage management function 86 of the management server 20 is acquired from the storage device 50.

FIG. 7 shows an example of the volume table 78 per application that manages a list of volumes that satisfies requirements of each application.

This volume table 78 per application is a secondary table in a sense that is created by referring to the aforementioned application requirement table 71, the performance table 73, the reliability table 75, and the total volume table 76. This table 78 is created by a processing unit in the storage operation management system 80, but the details are described later.

In Table 78, an application type 781 registers names 786 to 788 for identifying an application and corresponds to the application type 711 of the application requirement table 71. A volume ID 782 is used for discriminating each volume 51 and corresponds to the volume ID 761 of the total volume table 76. A performance level 783 is a value calculated based on the necessary performance and evaluation function coefficients of the application requirement table 71.

As an example, the performance level 783 of the record 786 is calculated from a record 772 of the total volume table 76, the record 723 of the application requirement table 71, and the record 742 of the performance table 73. A formula in this case is:

(write performance 735)×(evaluation function coefficient for write performance value 716)

+(read performance 736)×(read performance value 717)

+(IOPS 737)×(IOPS 718)

=performance level 783.

Using specific values as described below:

1,500×0.5+2,400×4.0+20×40=11,150

A reliability level 784 of the record 786 is obtained from the record 772 of the total volume table 76 and the record 756 of the reliability table 75. In this case, a value of the reliability 754 of the reliability table 75 is used as is, but any formula can also be installed (introduced) in the same manner as the performance level so that any calculation may be performed.

Subsequently, the management of the volume information and the volume selection processing operation in the storage operation management system 80 are described.

FIG. 8 shows a processing operation in the volume information management unit 82 of the storage operation management system 80.

The processing operation shown in FIG. 8 is performed when the storage device 50 was installed newly or when the volume configuration that arises from the expansion of the volume 51 in the storage device 50 changed. Under the operation of the storage management function 86, a type name, a drive type, a RAID level, a drive configuration, write performance, read performance, an IOPS, and an attribute value of reliability are acquired as the information on a specification value from the storage device 50 in which a newly installed or internal volume was extended (8401). Moreover, as another method, instead of automatically acquiring the write performance, read performance, IOPS, and attribute value of reliability from the storage device 50, the specification value information unique to a storage device is obtained as a file of a recording medium and a system administrator can also perform file input from the operation management terminal 10 or input these specification value information from the input unit of the operation management terminal 10.

Subsequently, whether the acquired specification value information was registered in the performance table 73 is checked (8402). When all specification value information were registered in the performance table 73, processing proceeds to Step 8404. On the contrary, if there is unregistered specification value information, the unregistered specification value information is acquired in the same method and additional registration of a record is performed in the reliability table 75 (8403).

Subsequently, whether the acquired specification value information was registered in the reliability table 75 is checked (8404). When all specification value information were registered in the reliability table 75, processing proceeds to Step 8406. On the contrary, if there is unregistered specification value information, the specification value information is acquired and additional registration of a record is performed in the reliability table 75 (8405).

Subsequently, all volume information of the storage device 50, that is, a volume ID, a drive type, a RAID level, a drive configuration, and an allocated state are acquired (8406).

Then regarding each volume, these information are registered in the total volume table 76 as the addition of the record (5407).

Further, in the step 8407, the volume table 78 per application is updated regarding the updated record. This processing is performed repetitively for one record added to the total volume table 76 as many as the number of records of the application requirement table 71. Only when necessary performance is not satisfied every application, the record is added to the volume table 78 per application. For example, in the example shown in Table 78, the record that corresponds to the record 771 of the total volume table 76 is not registered. This is because a condition of "RAID5" that is the specification of the RAID level required as an image file in the record 723 of Table 71 is not satisfied.

In the example of the aforementioned processing operation, the timing this processing is performed is the Step 8503 of the volume selection processing described later. With the new installation of the storage device 50 or the expansion of the volume 51 in the storage device, however, a user can also issue a processing request to the storage operation management 80 explicitly. Further, with these new installation and expansion, a notification is performed from the storage device 50 to the storage operation management system 80. This notification can also be regarded as the timing. Further, as another example, the storage operation management system 80 performs the state monitoring of the storage device 50 periodically using the storage management function 86 and the time a configuration change was detected can also be regarded as the timing.

Figure 9:
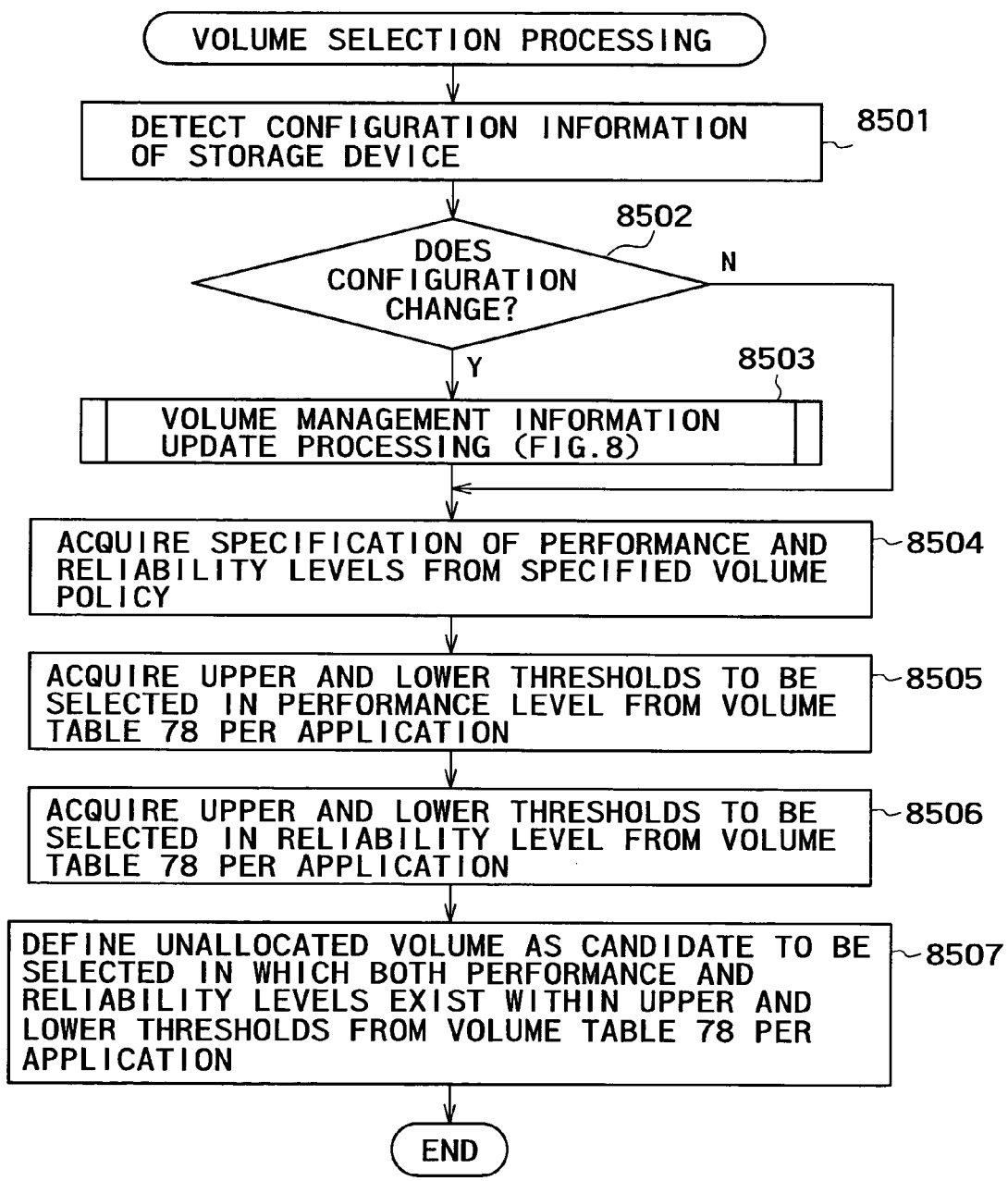
FIG. 9 is a drawing showing an example of the flowchart of a volume selection processing operation.

FIG. 9 shows a processing operation in the volume selection processing unit 83 of the storage operation management system 80.

This processing is performed after an item of a volume selection policy was input during user volume allocation processing. Hereupon, the performance and reliability levels are specified at three levels of "High", "Mid", and "Low" as an example. Needless to say, however, they can also be specified at the number of levels that differs from the three levels.

First, the configuration information of the storage device 50 is detected (8501). This configuration information is the number of storage devices 50 and the number of volumes. This configuration information is detected as follows, for example. The storage management function 86 of the storage operation management system 80 monitors the configuration of the storage device 50 connected to the SAN 92 and transmits the information to be checked periodically via the SAN 92. The configuration information from the storage device 50 is acquired as a response to the monitoring information.

Subsequently, whether the configuration information of a storage device changes or not is determined from this acquired configuration information (8602).

To be more specific, the storage management function 86 of the storage operation management system 80 transmits a broadcast packet to the SAN 92. On the contrary, when a replied packet is checked and a message indicating that the replied packet is a reply from the storage device 50 whose existence was not recognized up to the last time is recognized, the storage device 50 is determined to have been added newly. Further, when a volume list is acquired from an individual storage device to which a reply was made and the list differs from the previously acquired list, the volume is added to (or deleted from) the storage device and a change is determined to have occurred in the configuration information. When the configuration information is determined to have changed, processing moves to the update processing operation of the volume management information as shown in FIG. 8.

On the other hand, when it is determined that the configuration does not change, processing proceeds to the Step 8504. In the Step 8504, a system administrator acquires the specification of an application type, a performance level, and a reliability level from the specified policy information via the policy acquisition unit 81 (8504).

Regarding the policy specification by the system administrator, the display example of the operation management screen shown in FIG. 10 provides you with useful information. This management screen is the screen of the display of the operation management terminal 10. The system administrator inputs a necessary policy from the input unit and the policy is displayed. In the example of the display screen of FIG. 10, the input policy and the information on the volume selected finally according to this embodiment are displayed. For example, "Performance Level: Mid" and "Reliability Level: High" are specified as the policies. The information on these policies is acquired based on the control of the policy acquisition unit 81.

Then at this stage, the performance table 73, the reliability table 75, the total volume table 76, and the volume table 87 per application have already been updated in accordance with the flowchart of FIG. 8. That is, the information used for forming the distribution in which a new volume extended in a system is also contained as shown in the right side of FIG. 2 is held, but a new threshold is not decided yet.

Accordingly, in the Step 8505, the upper and lower thresholds that are within the performance level selection object range are acquired from the volume table 78 per application (8505).

As a specific processing procedure, the records of the volume table 78 per application in which the application type 781 matches the application type specified according to a policy are rearranged at the performance level 783 and the upper and lower limit values that correspond to the range specification of the performance level specified according to the policy are decided.

For example, the system configuration is changed and the number of volumes is assumed to be set to 27 as shown in FIG. 2. In this case, if both the performance and reliability levels are assumed to be specified at three levels of "High", "Mid", and "Low", nine volume each will be included in each level. Accordingly, the threshold (that is, upper limit value) between "High" and "Mid" of the performance level is decided so that the value of the record (that is, volume) of the performance level 783 column of the volume table 78 per application can be a boundary in the tenth record value from the top. Further, the threshold (lower limit value) between "Mid" and "Low" is decided so that the value of the record of the performance level 783 can be fixed as the boundary in the 18th record value.

When the threshold of the performance level is decided, the threshold of the reliability level is decided subsequently. Similarly, the threshold that is within the level selection object range of the reliability is acquired based on the volume table 78 per application (8506).

As a specific processing procedure, the records of the volume table 78 per application in which the application type 781 matches the application type specified according to a policy are rearranged at the reliability level 784 and the upper and lower limit values that correspond to the range specification of the reliability level specified according to the policy are acquired.

For example, when the policy range specification is "Mid" and the number of records is 27, the tenth record value from the top of the value of the reliability level 784 is set to the upper limit value. Similarly, the value of the reliability level 784 is decided so that the 18th record value can be set to the lower limit value.

Moreover, as shown in the aforementioned example, instead of evenly deciding the threshold in accordance with the number of classification items according to a policy, for example, the thresholds of performance and reliability can also be decided by changing ratios such as 30% for "High" and "Low" and 40% for "Mid". Further, the thresholds can also be set by providing overlapping portions such as higher level 40% for "High", middle level 40% for "Mid", and lower level 40% for "Low".

When the performance and reliability thresholds are set, whether or not there is an unallocated volume of an object specified according to a policy exists is checked subsequently. If the volume exists, the processing of selecting the volume newly is performed.

That is, from the records of the volume table 78 per application, the application type 781 matches an application type specified according to a policy, the performance level 783 and the reliability level 784 are within the range of the upper and lower thresholds obtained as described above, and an allocated state 785 fixes an "Unallocated" volume as a candidate to be selected.

When an allocation candidate volume is decided by the aforementioned processing, a type name (DF500) and a volume ID (D50.7.31) of the selected volume are displayed on a display screen, as shown in FIG. 10. When a system administrator checks this display and selects "OK", the input of the confirmation instruction is sent from the operation management terminal 10 to the operation management server 20. Subsequently, the information on a server name and an application type of the business server that the system administrator inputs at the beginning and is held by the storage operation management system 80 is processed together. That is, the setting of the selected storage device 50 is performed by the control of the storage management function 86 and the volume allocation processing specified by the volume allocation processing unit 84 is executed.

Further, the setting of the business server 30 specified and input by the system administrator at the beginning is performed by the control of the server management function 85. Further, in the total volume table 76 and the volume table 78 per application, the allocated state of the record regarding a newly installed volume is set for "Allocated".

A series of volume allocation processing terminates with this.

As described above, according to this embodiment, even when a volume distribution state changed in the whole storage system due to the new installation of a storage device and the expansion of a volume, there is an effect that a user designed volume can be selected from the range specified according to the volume selection policy without needing to reset a policy definition value by calculating a rank value using an evaluation function for every application based on a specification value of the volume.

One embodiment of the present invention was described above. The present invention is not limited to the aforementioned embodiment, but it can be executed by modifying the embodiment in various ways.

As the aforementioned example, in the volume distribution shown in FIG. 2 and the description of FIGS. 3, 4 and later, a method for grasping two parameters of performance and reliability as attribute values of a storage device and calculating a standard value (threshold) of level classification when a volume is selected for these attribute values was described.

As a modification example against this, for example, as shown in FIG. 11, performance/cost distribution is obtained as an attribute value and a change in the configuration status of the storage device in this distribution is detected, and a standard value that classifies a level in accordance with the change, that is, a threshold, can also be calculated and decided. The performance/cost attribute is classified into three levels of "High", "Mid", and "Low". For example, when an inexpensive storage device is connected to the SAN 92 and configuration information changed, a new standard value can also be decided by calculating the standard value of the level classification from the volume distribution after the change so that the volume belonging to "High", "Mid", and "Low" can reach an equal number as shown in FIG. 11.

In this case, various tables regarding cost must be prepared. For example, in the embodiment described previously, it can be assumed that the reliability table 75 changes to a cost table and a reliability item in the table changes to "Cost". The cost can be expressed in a unit price per unit storage capacity.

As another modification example, for example, each of the aforementioned tables 71, 73, 75, 76, and 78 is one example. So long as each table does not deviate from the purpose of the present invention, the present invention can be executed by changing and adding items of the table in various ways.

Further, these tables need not always be composed of five formats. Under some circumstances, various tables can be integrated or divided. For example, the performance table 73 and the reliability table 75 can also be integrated and created as one table.

Further, as another modification example, in the example of the aforementioned FIG. 2 or FIG. 9, performance and reliability are used as the attribute value of a storage device, and the performance and cost are used in the alternative example of FIG. 11. In the modification example, however, only one of them can also be used as the attribute value. For example, the table regarding only performance or only cost is prepared, and a level standard value can also be obtained in accordance with a change in the configuration information of the storage device.

According to the present invention, characteristics regarding a business application, an attribute value such as performance or reliability, and classification of the level are managed by a storage management system. A user can select a volume easily by specifying the type of the application and the performance or reliability level as policy elements, thereby improving the system operability.

Further, even when the configuration status of a storage device in a storage system changed, the volume selection and allocation processing is performed easily in accordance with the change.

What is claimed is:

1. A storage operation management method for managing operations of a plurality of storage devices storing information that is provided to a business server having a plurality of applications accessed via a network, the method executed by an operation management server coupled to the network, comprising:

acquiring, from the plurality of storage devices, characteristic values defined for each volume of the plurality of storage devices, and storing the acquired characteristic values in memory with a correspondence to said each volume defined thereby;

obtaining a performance level and a reliability level of each of the volumes according to a type of an application, and storing the obtained performance and reliability levels, wherein said performance and reliability levels are obtained by using attribute information defined for each of the volumes and evaluation function coefficients previously stored in association with the type of application;

obtaining upper and lower limit threshold values of each of a plurality of classification levels from the obtained performance and reliability levels of each of the volumes, based on a policy for selecting volumes, and making a correspondence between each of the volumes and each of the classification levels based on the classification level to which the performance and reliability values of each volume correspond; and determining a candidate volume to be selected and made accessible to said business server, based on a classification level designated by a user and on the correspondence between each of the volumes and each of the classification levels, wherein said classification levels are obtained according to evaluation values of attribute information of each of the volumes by using an evaluation function for each application, and the upper and lower limit threshold values for each of the classification levels are obtained by dividing the total amount of the volumes based on a ratio according to each of the classification levels provided by the policy.

2. A storage operation management system which includes a plurality of storage devices coupled to a network and an operation management server for managing operations of the storage devices, and which provides information from the storage devices to a business server having a plurality of applications accessed via the network, the operation management server comprising:

an acquiring means for acquiring, from the plurality of storage devices, characteristic values defined for each volume of the plurality of storage devices, and storing in memory the acquired characteristic values with a correspondence to said each volume defined thereby;

a first obtaining means for obtaining a performance level and a reliability level of each of the volumes according to a type of an application, and storing the obtained performance and reliability levels, wherein said performance and reliability levels are obtained by using attribute information defined for each of the volumes and evaluation function coefficients previously stored in association with the type of application;

a second obtaining means for obtaining upper and lower limit threshold values of each of a plurality of classification levels from the obtained performance and reliability levels of each of the volumes, based on a policy for selecting volumes, and making a correspondence between each of the volumes and each of the classification levels based on the classification level to which the performance and reliability values of each volume correspond; and a determining means for determining a candidate volume to be selected and made accessible to said business server, based on a classification level designated by a user, and on the correspondence between each of the volumes and each of the classification levels, wherein the first obtaining means comprises a third obtaining means for obtaining evaluation values for attribute information of each of the volumes by using an evaluation function for each application, and the second obtaining means comprises a fourth obtaining means for obtaining the upper and lower threshold values for each of the classification levels by dividing the total amount of the volumes based on a ratio according to each of the classification levels provided by the policy.

* * * * *